US 6,431,817 B1

(12) United States Patent
Simkowski (10) Patent No.: US 6,431,817 B1
(45) Date of Patent: Aug. 13, 2002

(54) PALLETIZING OR DEPALLETIZING UNSTABLE ARTICLES UTILIZING ARTICLE GROUP PICK-UP AND TRANSFER

(75) Inventor: Donald J. Simkowski, Loveland, CO (US)

(73) Assignee: Goldco Industries, Inc., Loveland, OH (US)

( * ) Notice: Subject to any disclaimer, the term of this patent is extended or adjusted under 35 U.S.C. 154(b) by 0 days.

(21) Appl. No.: 09/629,139

(22) Filed: Jul. 31, 2000

(51) Int. Cl.[7] ............................................... B65G 59/02
(52) U.S. Cl. ............................... 414/796.9; 414/791.6; 414/796.2; 414/788.9; 414/789.5
(58) Field of Search ........................... 414/788.2, 788.9, 414/789.5, 791.6, 792.6, 795.6, 796.2, 796.9

(56) References Cited

U.S. PATENT DOCUMENTS

| 2,858,009 | A | | 10/1958 | Bainbridge |
| 3,517,831 | A | | 6/1970 | Hahn |
| 3,608,746 | A | | 9/1971 | Meyer |
| 3,682,290 | A | | 8/1972 | Von Gal, Jr. et al. |
| 3,767,027 | A | | 10/1973 | Pund et al. |
| 3,897,877 | A | | 8/1975 | Vandermeer et al. |
| 4,802,571 | A | | 2/1989 | Born et al. |
| 4,809,965 | A | | 3/1989 | Vander Meer et al. |
| 4,834,605 | A | | 5/1989 | Jerred |
| 4,978,275 | A | | 12/1990 | Reid et al. |
| 4,979,870 | A | * | 12/1990 | Mojden et al. ........... 414/788.4 |
| 5,112,181 | A | * | 5/1992 | Rasmussen ................. 414/416 |
| 5,271,709 | A | | 12/1993 | Vander Meer et al. |
| 5,320,457 | A | | 6/1994 | VanderMeer et al. |
| 5,372,473 | A | | 12/1994 | Moyden et al. |
| 5,443,357 | A | | 8/1995 | Leeds et al. |
| 5,522,692 | A | | 6/1996 | Simkowski |
| 5,553,698 | A | | 9/1996 | Patios et al. |

FOREIGN PATENT DOCUMENTS

WO    WO 94/15862    * 7/1994

* cited by examiner

*Primary Examiner*—Christopher P. Ellis
*Assistant Examiner*—Mark A. Deuble
(74) *Attorney, Agent, or Firm*—Robert E. Harris (57) ABSTRACT

Palletizing or depalletizing unstable articles is disclosed. A first conveyor, connected with a first carriage, has a plurality of pick-up units, each with mechanically movable elongated arms, to engage plural articles in different ones of associated rows of articles at a first area, located at either a load station or at a depalletizing station, enabling pick up and removal of articles by groups (normally layers) in plural rows with plural articles in each row, and transfer of the removed articles from the first area to a second area, located at either a palletizing station or at an unload station, for deposit of the articles thereat. An adjustor unit varies the spacing between the pick-up units, a second conveyor, connected with a second carriage, deposits and removes spacer sheets at the palletizing-depalletizing station that also has an orienting unit to assure orienting of articles at the palletizing-depalletizing station, and an additional conveyor unit transfers articles by groups to the load-unload station.

34 Claims, 6 Drawing Sheets

Fig-1

Fig_2

Fig_3

Fig_3A

Fig_3B

Fig_4

Fig_5A   Fig_5B

Fig_6   Fig_7

Fig_8A

Fig_8B

Fig_9A

Fig_9B

PALLETIZING OR DEPALLETIZING UNSTABLE ARTICLES UTILIZING ARTICLE GROUP PICK-UP AND TRANSFER

FIELD OF THE INVENTION

This invention relates to palletizing or depalletizing articles, and, more particularly, relates to unstable article palletizing or depalletizing utilizing article group pick up and transfer.

BACKGROUND OF THE INVENTION

It is oftentimes necessary to mass transfer, or convey, articles from one location to another, and it has been found that some articles, such as, for example, unstable articles that tend to tip or fall during transfer, or conveyance, often require special care and/or equipment adaptation to maintain the articles in the intended position during transfer, or conveyance.

It is known, for example, that article transfer can include the use of: article pick up—see, for example, U.S. Pat. No. 3,608,746 (Meyer) and U.S. Pat. No. 5,443,357 (Leeds et al.); leading and/or trailing arms—see, for example, U.S. Pat. No. 4,978,275 (Reid et al.), U.S. Pat. No. 5,271,709 (VanderMeer et al.), and U.S. Pat. No. 5,522,692 (Simkowski); providing multiple single line rows—see, for example, U.S. Pat. No. 3,767,027 (Pund et al.), U.S. Pat. No. 4,834,605 (Jerred), and U.S. Pat. No. 5,320,457 (VanderMeer et al.); and/or row adjustability see, for example, U.S. Pat. No. 3,767,027 (Pund et al.).

It is also known that unstable articles, such as, for example, plastic bottles, having a neck portion with a protrusion, such as a neck ring thereon, can be conveyed by gripping the bottles between flanges or the like that receive the neck portions of the bottles therebetween—see, for example, U.S. Pat. No. 4,802,571 (Born et al.) and U.S. Pat. No. 5,553,698 (Patois et al.).

It is also known that palletizing of articles can include transfer of spacer sheets as a part of palletizing or depalletizing of articles—see, for example, U.S. Pat. No. 4,809,965 (VanderMeer et al.), and that palletized layers of articles and spacer sheets can be oriented after deposit on a pallet—see, for example, U.S. Pat. No. 3,897,877 (VanderMeer et al.).

It is likewise also known that article transfer, including article pick up for palletizing or depalletizing of articles, can include straight line article movement (i.e., vertical-horizontal-vertical movement) during transfer of articles and/or spacer sheets—see, for example, U.S. Pat. No. 2,858,009 (Bainbridge), U.S. Pat. No. 3,517,831 (Hahn), U.S. Pat. No. 3,682,290 (Von Gal, Jr. et al.), U.S. Pat. No. 4,978,275 (Reid et al.), and U.S. Pat. No. 5,372,473 (Moyden et al.).

It is further known that groups of unstable articles, such as cans, have heretofore been picked up and transferred to or from a palletizer—see, for example, U.S. Pat. No. 2,858,009 (Bainbridge) and U.S. Pat. No. 3,682,290 (Von Gal, Jr. et al.), that plural can lids have heretofore been picked up as a group from a tray by a spring biased pick-up unit and transferred to a second location—see, for example, U.S. Pat. No. 5,372,473 (Moyden et al.), and that groups of articles, such as bottles, have heretofore been individually picked up and transferred between different locations in loading or unloading of pallets—see, for example, U.S. Pat. No. 3,517,831 (Hahn).

SUMMARY OF THE INVENTION

This invention provides an improved device and method for palletizing or depalletizing articles, and particularly unstable articles, such as containers, or bottles, having a neck portion normally with a neck ring thereon.

An article conveyor is utilized for transfer of articles by groups with the article conveyor having a plurality of pick-up units, each of which has an article engaging assembly, preferably with one or more mechanically movable elongated arms, to engage plural articles in different ones of associated rows of articles at a first area to enable pick up and removal of plural rows of articles with plural articles in each row, and preferably pick up and removal of an entire layer of articles, from the first area and transfer of the removed articles to a second area for deposit, or release, thereat, with transfer of articles by the article conveyor including pick up of articles either at a load station for palletizing operations or at a depalletizing station for depalletizing operations and transfer of the removed articles to a palletizing station for palletizing operations or to an unload station for depalletizing operations.

A spacer sheet conveyor is normally also utilized to deposit and remove spacer sheets at the palletizing-depalletizing station, and movable carriages are provided for controlled movement of both the article conveyor and the spacer sheet conveyor with such movement normally being in essentially straight line segments (i.e., vertical-horizontal-vertical movements).

An orienting unit is provided to assure orienting of articles and spacer sheets at the palletizing-depalletizing station, an additional conveyor unit is provided for controlled transfer of articles by groups to and from the load-unload station, and an adjustor unit is provided to vary the spacing between the pick-up units as needed.

It is therefore an object of this invention to provide improved article palletizing or depalletizing.

It is another object of this invention to provide improved palletizing or depalletizing of unstable articles, such as containers, or bottles, and particularly unstable articles having a neck portion normally with a protrusion, such as a neck ring, thereon.

It is another object of this invention to provide improved article palletizing or depalletizing utilizing a plurality of pick-up units each having an article engaging assembly to engage plural articles in different ones of associated rows of articles and thereby remove and transfer plural articles by groups in plural rows with plural articles in each row between different locations.

It is another object of this invention to provide improved article palletizing or depalletizing utilizing a plurality of pick-up units each having an article engaging assembly with one or more mechanically movable elongated arms for effecting removal and transfer of articles by groups with plural articles in plural rows between different locations.

It is another object of this invention to provide improved article palletizing or depalletizing utilizing at least one of article transfer by layers, spacer sheet conveying, conveyor movement utilizing one or more movable carriages, orienting of articles and/or spacer sheets, adjustment of article pick-up unit spacing, and/or additional group conveying of articles.

With these and other objects in view, which will become apparent to one skilled in the art as the description proceeds, this invention resides in the novel construction, combination, arrangement of parts, and method substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Figure 1:
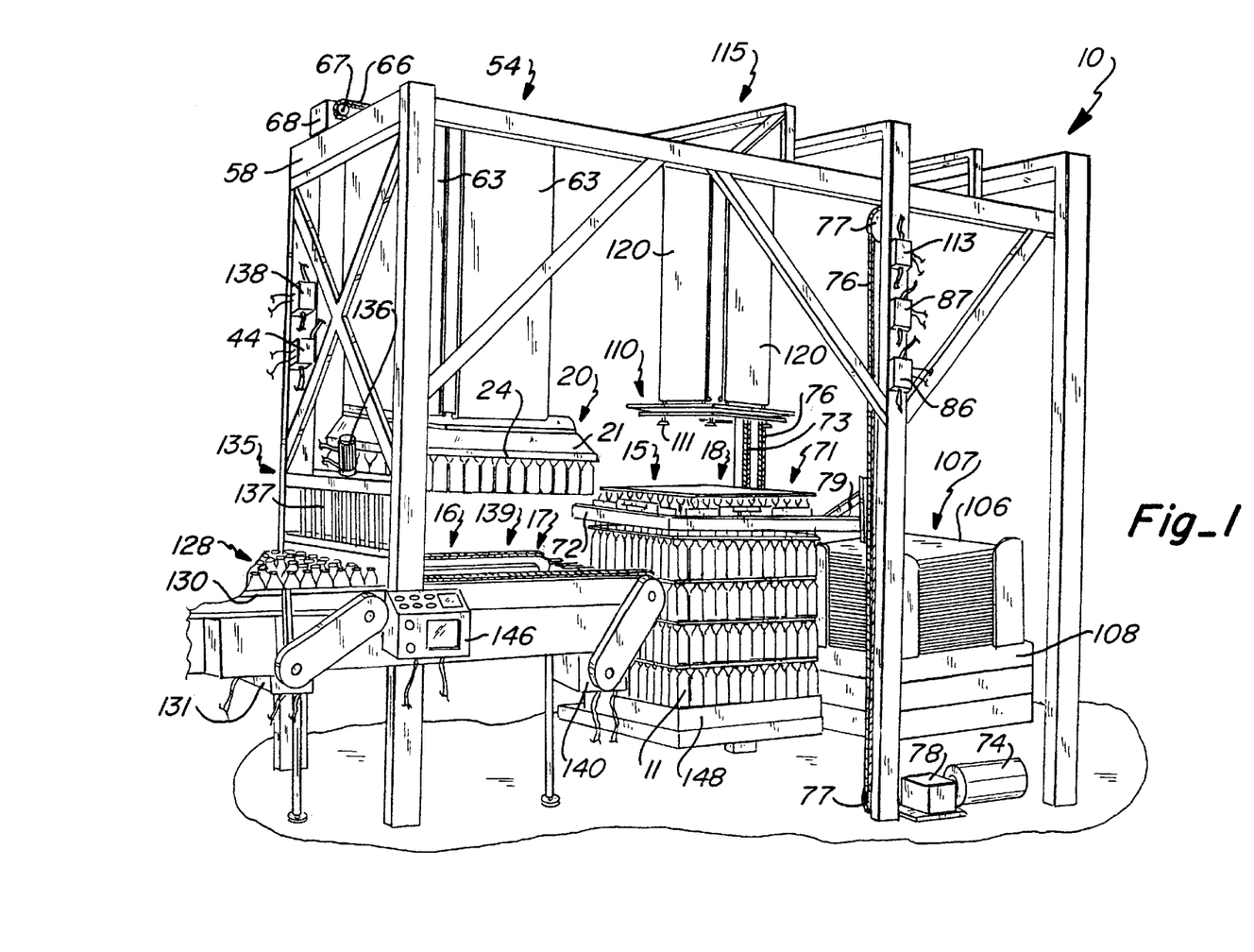
FIG. 1 is a perspective view of the device of this invention.
Figure 2:
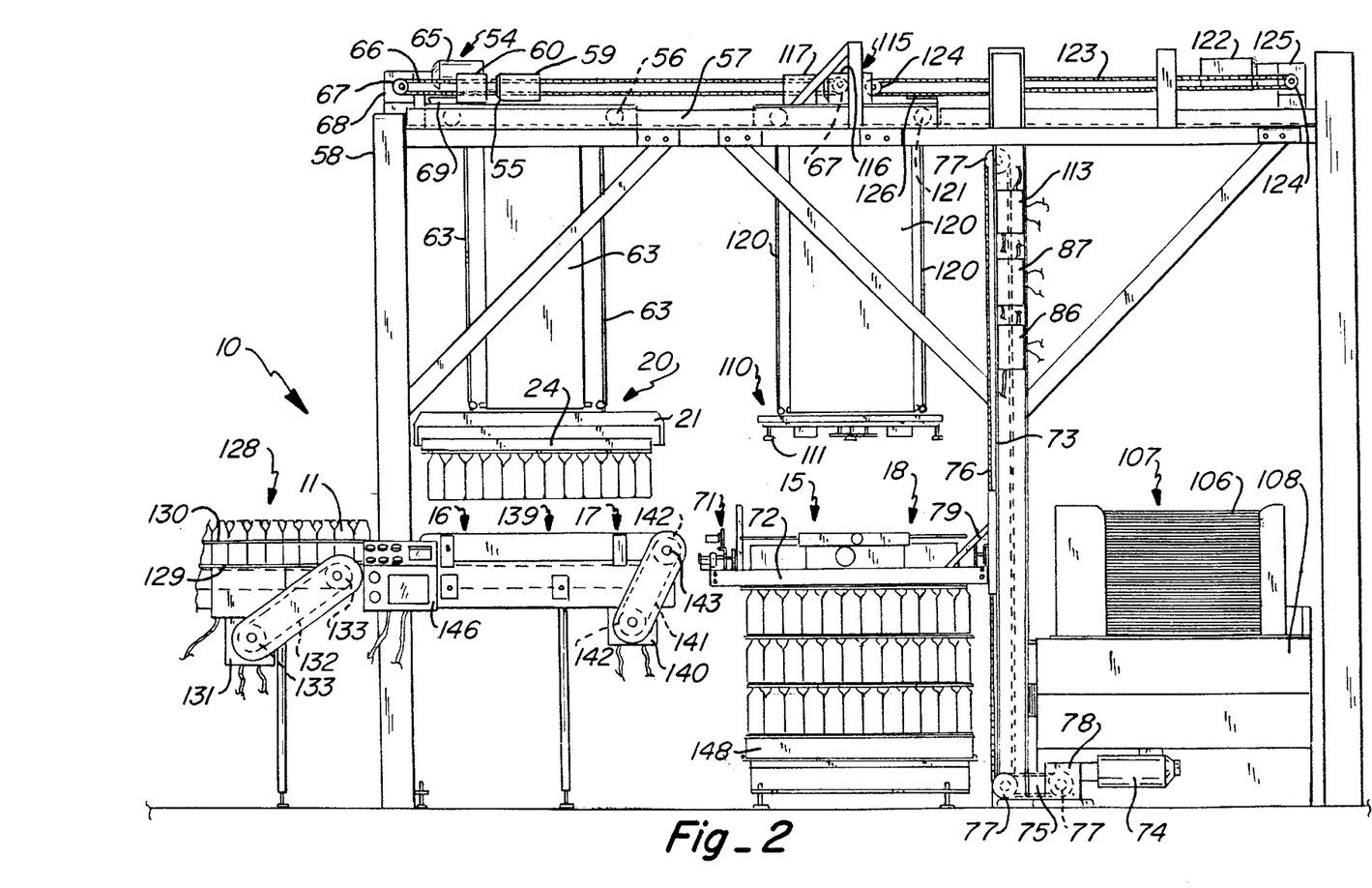
FIG. 2 is a side view of the device shown in FIG. 1.
Figure 3:
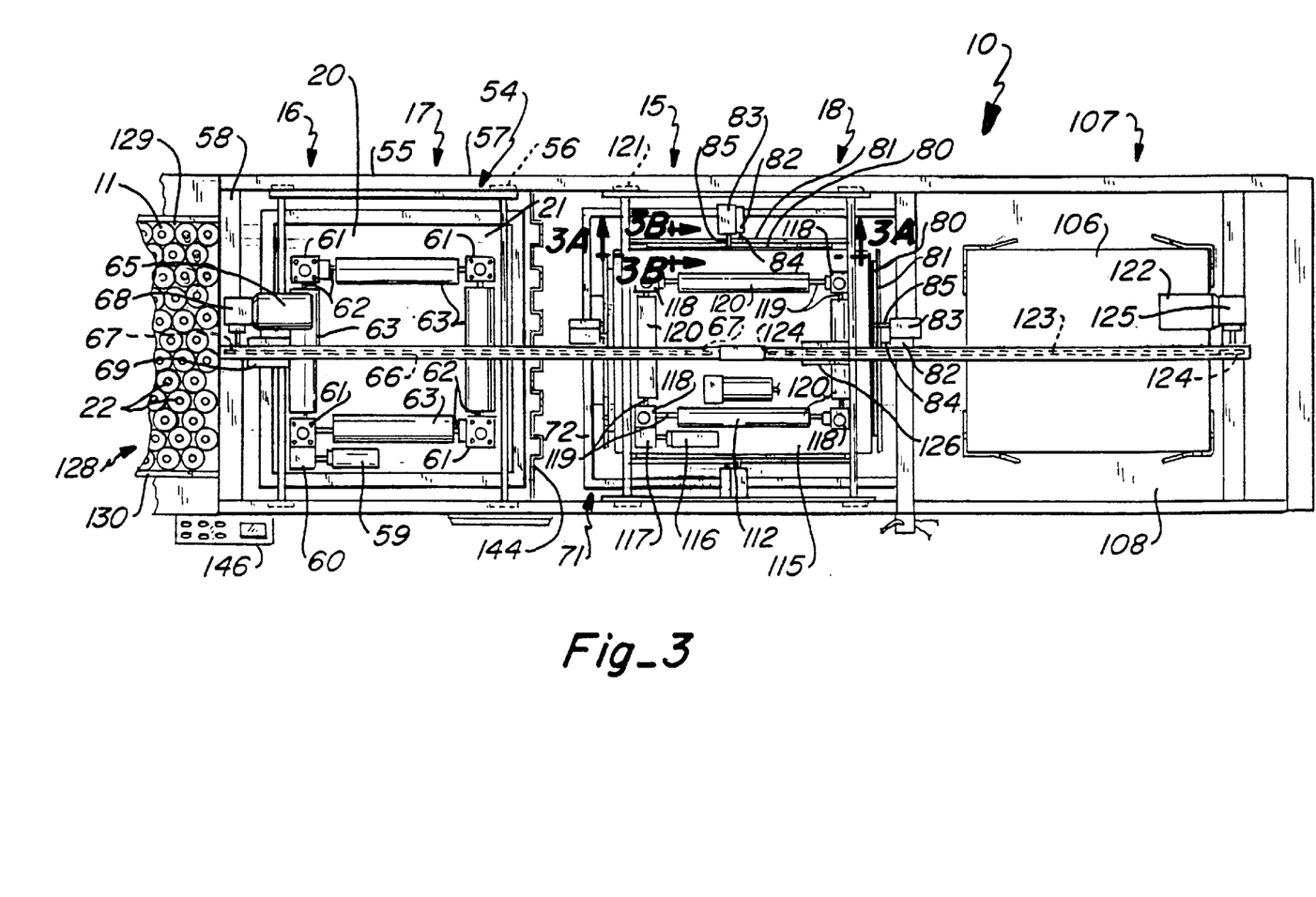
FIG. 3 is a top view of the device shown in FIGS. 1 and 2.
Figure 3A:
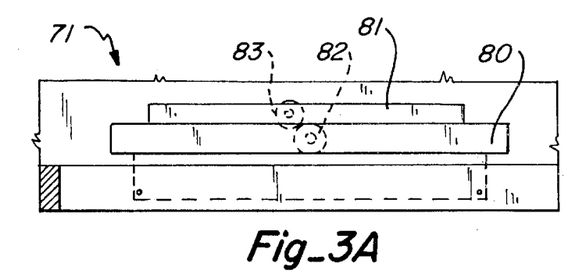
FIGS. 3A and 3B are section views taken through 3A—3A and 3B—3B, respectively, and illustrating the fences and actuators at one side of the orienting unit.
Figure 3B:
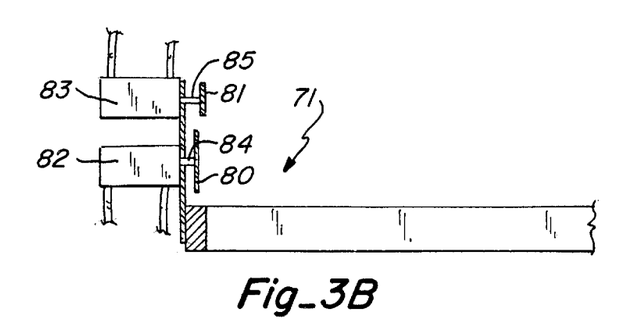

As shown in FIGS. 1 through 3, palletizing-depalletizing device 10 is capable of operation to either palletize or depalletize articles 11, particularly unstable articles or containers (illustrated in the drawings, by way of example, as lightweight plastic bottles having, as best illustrated in FIGS. 5A, 5B, 6 and 7, a neck portion 12 with a protrusion, such as a neck ring, 13 thereon).

Device 10 includes a palletizing-depalletizing station 15 positioned horizontally adjacent to a load-unload station 16. Since device 10 is capable of operation to palletize or depalletize articles depending upon the direction of travel of articles between stations 15 and 16, article transfer, as described herein, includes article movement from first area 17 to second area 18 for either palletizing or depalletizing of articles.

For palletizing operations, first area 17 is located at load-unload station 16 and is a load station and second area 18 is located at palletizing-depalletizing station 15 and is a palletizing station (as is indicated for clarity in FIG. 1), and for depalletizing operations, first area 17 is located at palletizing-depalletizing station 15 and is a depalletizing station and second area 18 is located at load-unload station 16 and is an unload station.

Article, or first, conveyor 20 (shown in FIGS. 1 through 4 with a cover 21) is used to pick up and transfer articles 11 from first area 17 (with the articles arranged at first area 17 for pick up as a group with the articles in plural rows 22 and with each row having plural articles 11) to second area 18 for deposit of the transferred articles thereat.

Article conveyor 20 includes a plurality of pick-up units 24, with the number of pick-up units normally being equal to the number of longitudinally extending rows 22 of articles at first area 17, indicated in the drawings to be a plurality of longitudinally extending rows of articles with plural articles in each row (and may be, for example, 12 longitudinally extending rows of articles with 12 articles in each row), and each pick-up unit is associated with a different one of said plural rows of articles at the first area.

As best shown in FIGS. 4 through 7, each pick-up unit 24 has an article engaging assembly 25 that is preferably mechanically movable and includes at least one mechanically movable, longitudinally extending, elongated arm 26, with use of dual movable elongated arms 26, having article engaging portions 27 (with article engaging portions 27 preferably including an inwardly directed flange 28 terminating at edge portion 29 for article engagement thereat) that are relatively movable toward and away from one another, being now preferred.

Arm control assembly 31 is used to position each article engaging assembly 25, and, more particularly, each elongated arm 26 and article engaging portion thereof 27. With a pair of elongated arms 26 utilized in each pick-up unit 24, as is best illustrated in FIGS. 6 and 7, each elongated arm 26 is mounted on arm 32 of different ones of a pair of pivotable rockers 33 in conventional manner by means of fasteners 34, such as nuts and bolts as indicated in FIGS. 4 through 7, and the pair of rockers 33 are pivotably mounted on frame 35 of pick-up unit 24 by pivot bolt 36.

Figure 6:
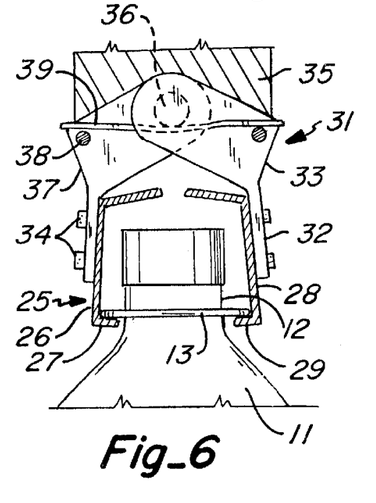
FIG. 6 is a partial section view taken through 6—6 of FIG. 5A and illustrating one pick-up unit with the arm control assembly and the article engaging assembly in the biased closed position.
Figure 7:
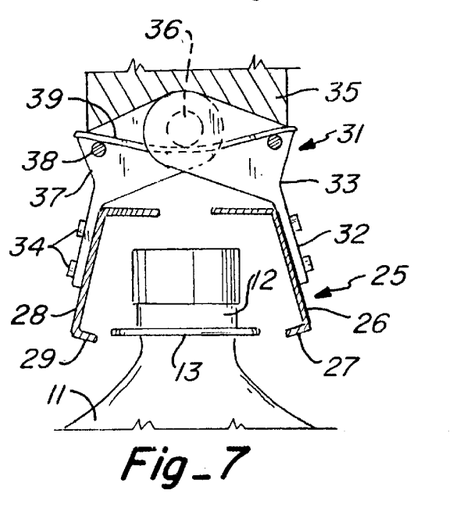
FIG. 7 is a partial section view like that of FIG. 6 but taken through 7—7 of FIG. 5B and illustrating one pick-up unit with the arm control assembly and the article engaging assembly in the open position.

As illustrated in FIGS. 6 and 7, each rocker 33 also includes a shoulder 37 having an aperture with actuating pin 38 mounted therein so that actuating pins 38 are located at opposite sides of frame 35 of each pick-up unit 24 with pivot bolt 36 being positioned therebetween. A constant force applicator (shown as spring 39) extends between the top portion of each actuating pin 38 at opposite sides of pivot bolt 36, and the mid-portion of spring 39 engages the bottom portion of pivot bolt 36.

Bias is exerted by spring 39 to urge actuating pins 38 downward to thereby urge the arms of the pair of rockers to be rotated in opposite directions to urge the article engaging portions of elongated arms 26 toward one another (and thus toward article engagement) to the closed position of arm control assembly 31 and article engaging assembly 25 (including to the closed position of elongated arms 26 and article engaging portions 27 thereof), as is illustrated in FIG. 6.

Figure 4:
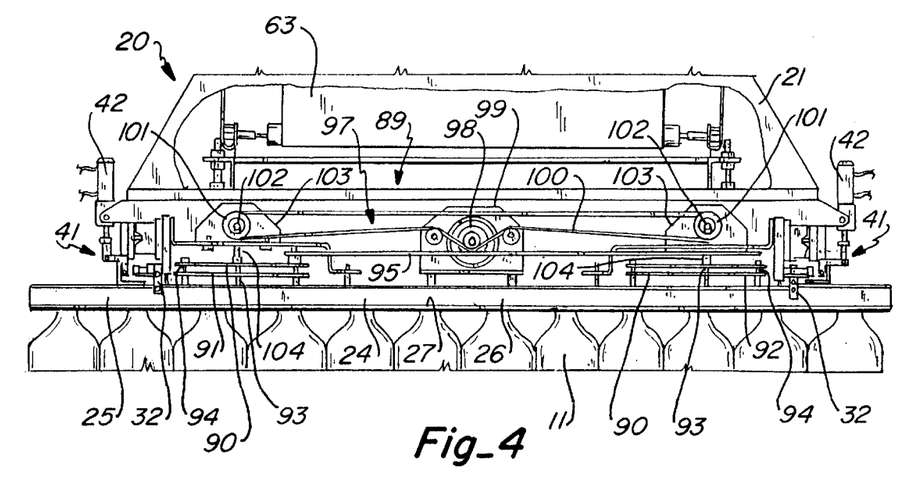
FIG. 4 is a side view of the article conveyor shown in FIGS. 1 through 3 with the conveyor cover broken away.
Figure 5A:
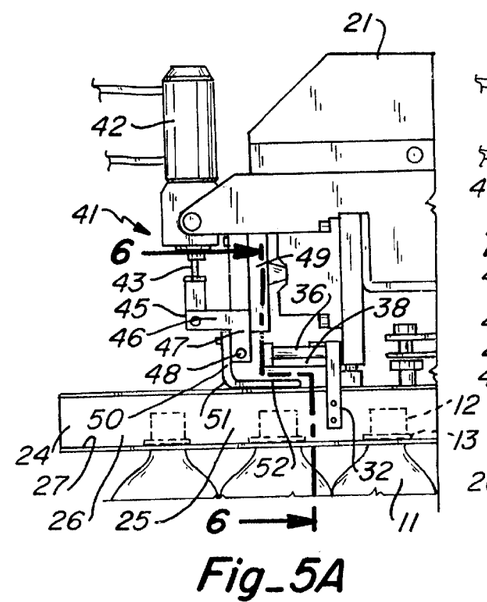
FIGS. 5A and 5B are enlarged side views of a portion of the article conveyor shown in FIG. 4 to particularly illustrate the arm actuator unit with FIG. 5A illustrating positioning of the arm actuator unit to cause the arm control assembly and the article engaging assembly to be in the closed position and FIG. 5B illustrating positioning of the arm actuator unit to cause the arm control assembly and the article engaging assembly to be in the open position.
Figure 5B:
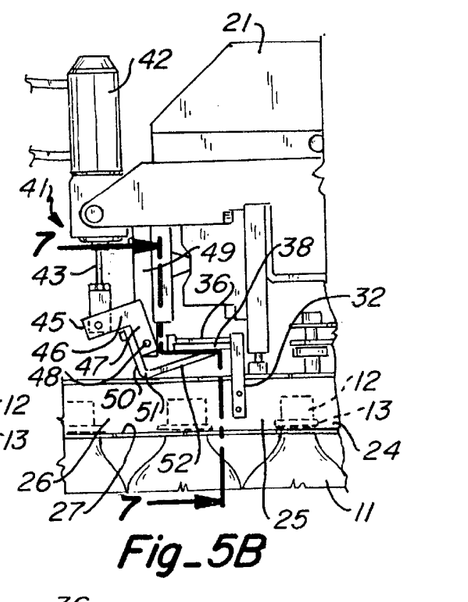

Arm actuator units 41, shown in FIG. 4, are mounted near the opposite ends of each of the longitudinally extending pick-up units (an enlarged illustration of one of the arm actuator units is shown in the non-actuating position in FIG. 5A and in the actuating position in FIG. 5B). Arm actuator units 41 have like actuating portions at each side of each pick-up unit to engaging the actuating pins thereat to move associated arm control assembly 31 from the closed position, as shown in FIG. 6, to the open position, as shown in FIG. 7. As best shown by FIGS. 5A and 5B, arm actuator unit 41 is positioned such that arm actuating unit 41 effects the positioning of actuating pins 38 only when the actuating pins are moved from the closed position to the open position.

As shown by FIGS. 6 and 7, associated article engaging portions 27 of each associated pair of elongated arms 26 at each pick-up unit 24 are urged away from one another (i.e., from the biased closed position to the open position) by moving actuating pins 38 upward to thereby cause rotation of the arms of rockers 33 in the opposite direction from the direction of bias applied by spring 39, with upward movement, or displacement of actuating pins 38 being caused by lever actuation at arm actuator units 41.

As shown in FIGS. 4, 5A and 5B, each actuator unit 41 includes air cylinder 42 (normally receiving air at about 80 psi from a conventional air source—as do all of the air cylinders utilized and described herein) having a plunger 43, the extension of which is effected by application of air to air cylinder 42 controlled by solenoid 44, connected between air cylinder 42 and the air source.

As best shown by FIGS. 5A and 5B, the extension of plunger 43 causes first arm 45 of each first L-shaped lever 46 (a lever 46 is positioned at opposite sides of each pick-up unit 24), having a second arm 47, to be moved downward to pivot first lever 46 about pivot pin 48 received in an aperture near the free end of second arm 47 and mounted in mount 49 connected with frame 35 of each pick-up unit 24.

Second arm 47 of each first L-shaped lever 46 has first leg 50 of each second L-shaped lever 51 (a lever 51 is also positioned at opposite sides of each pick-up unit 24) mounted thereon so that when first arm 45 of first L-shaped lever 46 is depressed (and thus pivoted), second arm 47 of first lever 46 is also pivoted to also pivot the legs of second L-shaped lever 51 to cause second leg 52 of second lever 51 to be raised from the position as shown in FIG. 5A to the position as shown in FIG. 5B (a single lever at each side of each pick-up unit might be utilized, at least for some applications, to be pivoted by extension of plunger 43 to raise a leg of the lever to engage and raise the associated actuating pin).

Upward movement of second legs 52 of second levers 51 (at opposite sides of each pick-up unit and therefore at opposite sides of each associated longitudinally extending row of articles) causes second legs 52 to engage and raise actuating pins 38 (extending from rockers 33 at each side of each pick-up unit 24).

When actuating pins 38 are raised (as occurs when plungers 43 of air cylinders 42 are extended to pivot second legs 52 of second levers 51 upward), the bias exerted by spring 39 on rockers 33 is overcome (as is illustrated in FIG. 7) and the article engaging portions of elongated arms 26 are rotated from the closed position to the open position (as occurs during normal operation after article conveyor 20 has been moved to a position at the second area where elongated arms 26 of the pick-up units are to be disengaged from the plural articles to enable discharge of the plural articles at the second area).

When plungers 43 of air cylinders 42 are retracted, actuating pins 38 are lowered by the bias imposed by spring 39 and the article engaging portions of elongated arms 26 are urged from the open position to the closed position (as illustrated in FIG. 6) so that the elongated arms engage and pick up the plural articles (as occurs during normal operation after article conveyor 20 has been moved to a position at the first area where elongated arms 26 of the pick-up units are to engage the articles to enable pick up of the plural articles at the first area).

Movement of article conveyor 20 is controlled by conveyor control assembly 54. As best shown in FIGS. 1 through 4, article conveyor 20 is movable both vertically and horizontally, and conveyor control assembly 54 includes article carriage 55 having wheels 56 riding on horizontal tracks 57 of frame, or support structure, 58.

Electric motor 59, mounted on carriage 55, is connected through gear box 60 to 90° gear box 61. Four rods 62 are connected at each end to 90° gear boxes 61 so that electric motor 59 drives all four rods 62, horizontally positioned near the four outer edges of carriage 55, to rotate the rods. A wide belt 63 is mounted on each rod 62 with the free end of each wide belt 63 being connected near the four outer edges of article conveyor 20 so that vertical movement (upward and downward) of conveyor 20 is effected by rotation of rods 62.

Horizontal movement of carriage 55 along horizontal tracks 57 is controlled by electric motor 65 mounted on frame 58 to cause and control reciprocal movement of conveyor 20 between the first and second areas at the load-unload and palletizing-depalletizing stations. As best shown in FIGS. 1 through 3, chain 66 is driven about sprockets 67 by electric motor 65 acting through gear box 68, with chain 66 being connected with carriage 55 by L-shaped connector plate 69.

While not illustrated herein, some arcuate movement of conveyor 20 could be established, if needed, after movement of conveyor 20 away from the first and second areas, by applying power to electric motor 65 prior to terminating power to electric motor 59.

Orienting unit 71 is provided at palletizing-depalletizing station 15 for operation in conjunction at least with palletizing operations. Orienting unit 71 is mounted on frame 58 adjacent to the side of palletizing-depalletizing station 15 opposite to that of load-unload station 16, and orienting unit 71 includes an orienting frame 72 (a movable, horizontally positioned, four-sided frame) that is moved upwardly and downwardly with respect to conveyor 20 on vertically extending tracks 73 by means of electric motor 74 driving chains 75 and 76 about sprockets 77 through gear box 78, with chains 76 being connected to orienting frame 72 by connector 79.

An article engaging, or lower, fence 80 and a spacer sheet engaging, or upper, fence 81 are provided to extend inwardly from each of the four sides of orienting frame 72 upon actuation by fence actuators 82 and 83, with orienting frame 72 being moved vertically upward and downward by electric motor 74 so that lower fences 80 are brought into alignment with the articles then being deposited at palletizing-depalletizing station 15 to assure orienting of articles during palletizing operations (and, if needed, to stabilize articles during depalletizing operations), and so that upper fences 81 are brought into alignment with the spacer sheet then being deposited to assure orienting of each spacer sheet during palletizing operations (and, if needed, to also stabilize positioning of each spacer sheet during depalletizing operations).

Fence actuators 82 and 83 (indicated best in FIG. 3 as air cylinders with extendible plungers 84 and 85 and with air to the air cylinders being controlled by solenoids 86 and 87) are connected between orienting frame 72 and lower and upper fences 80 and 81 of orienting unit 71 so that extension of plungers 84 causes inward movement of lower fences 80 to effect orienting of articles by urging the articles to a preselected position at the palletizing-depalletizing station, normally to effect centering of the articles thereat, and so that extension of plungers 85 causes inward movement of upper fences 81 to effect orienting of spacer sheets by urging the spacer sheets to a predetermined position at the palletizing-depalletizing station, normally to effect centering of the spacer sheets thereat.

Each of the lower fences are preferably caused to be substantially simultaneously moved inward to effect orienting of the articles, and each of the upper fences are likewise preferably caused to be substantially simultaneously moved inwardly to effect orienting of the spacer sheets.

Fence actuators, other than air cylinders as shown and described herein, might be utilized, at least for some applications, and could include, for example, movable guides mounted on opposing sides of orienting frame 72 so that the guides move substantially simultaneously inward to move the fences for orientation purposes.

As best shown in FIGS. 4, 8A, 8B, 9A and 9B, pick-up unit spacing adjustor 89 is provided on conveyor 20 to adjust the spacing between pick-up units 24, as needed, to accommodate plural row pick up of plural articles. As shown, pantograph 90 is utilized as a space determining unit for uniformly varying the spacing between the pick-up units, and pantograph 90 includes sections 91 and 92, mounted on conveyor 20 and connected with each pick-up unit 24.

Sections 91 and 92 of pantograph 90 are mounted on conveyor 20 to extend across the conveyor in a direction normal to the longitudinally extending elongated arms 26 of each pick-up unit 24 on conveyor 20 with the center pivots 93 of each section of the pantograph being connected to different ones of the pick-up units. As indicated in FIG. 4, outer pivots 94 at one side of each pivot section may be connected to rod 95 for stability purposes.

Figure 8A:
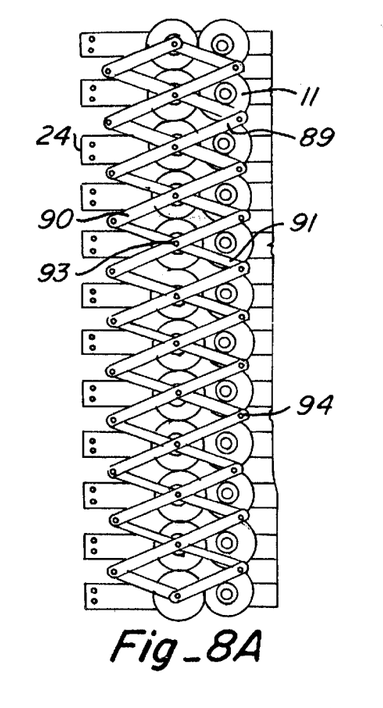
FIGS. 8A and 8B are simplified partial top views showing different sections of the pantograph of the pickup unit spacing adjustor in relation to the pick-up units with FIG. 8A illustrating a predetermined pattern of articles removed from the first area and with FIG. 8B illustrating substantially the same article pattern of articles deposited at the second area.
Figure 8B:
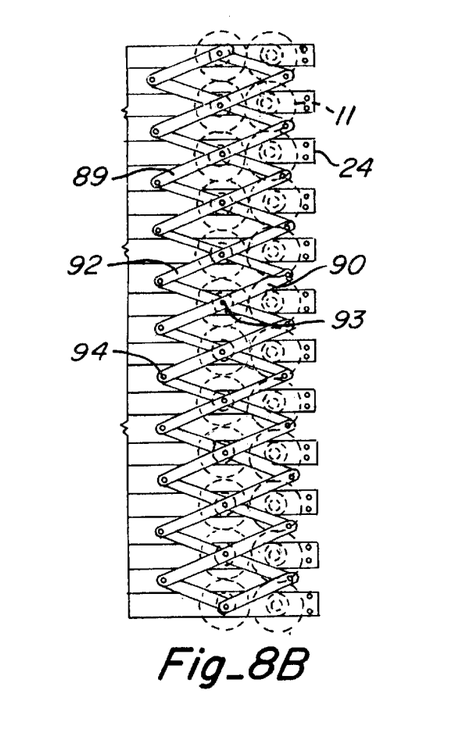

Groups (normally an entire layer) of articles have a predetermined pattern established at the first area and the pick-up units are spaced from one another to enable pick up of the articles in the predetermined pattern. Uniform spacing adjustments between the pick-up units to accommodate a particular then needed pattern can be readily achieved by spacing adjustor 89, either prior to article pick up (including during set up prior to commencement of normal operations) or during transfer of articles from first area 17 to second area 18, by causing movement of pantograph 90 in an opening or a closing direction, as needed.

Where needed variations in article spacing are effected prior to conveyance of articles from the first area to the second area during normal operations (as might occur, for example, to effect a needed spacing change to convey articles having a size or row alignment different from that of articles earlier conveyed), the pick-up units are spaced from one another as needed to accommodate the pattern, or arrangement, of the group (normally a layer) of articles at the first area (as is illustrated, by way of example, in FIG. 8A), and are conveyed from the first area to the second area where the group of articles are deposited at the second area in substantially the same article pattern, or arrangement, as removed from the first area (as is illustrated, again by way of example, in FIG. 8B).

While the articles are illustrated in FIGS. 8A and 8B as round containers, rectangular or square containers, or bottles, might also be conveyed in the same manner as illustrated in FIGS. 8A and 8B, and described herein in connection therewith.

Figure 9A:
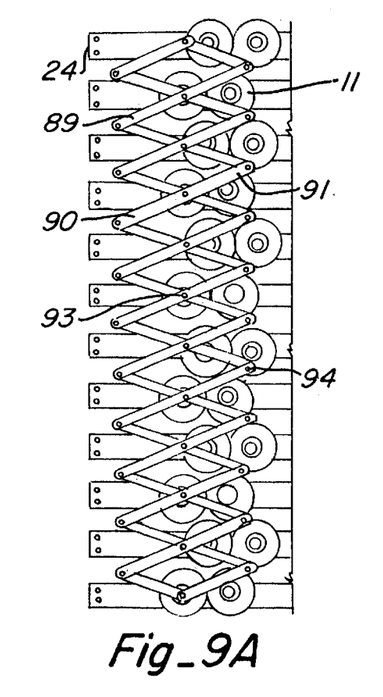
FIGS. 9A and 9B are simplified partial top views similar to that of FIGS. 8A and 8B with FIG. 9A illustrating a predetermined pattern of articles removed from the first area and with FIG. 9B illustrating a predetermined pattern of articles, different from the pattern of articles removed from the first area, deposited at the second area.
Figure 9B:
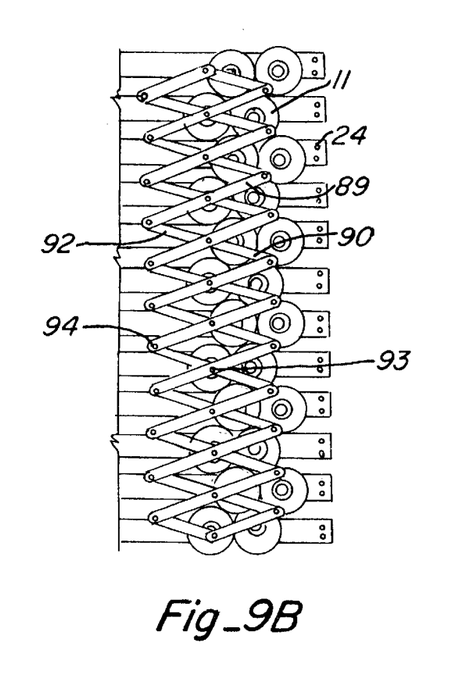

To achieve variations in article spacing during transfer, or conveyance, of the articles from the first area to the second area (as might occur, for example, where the rows of articles are to be adjusted to a pattern, or relationship, at the second area different from that at the first area), the necessary variations in spacing between the pick-up units are effected by spacing adjustor 89 during conveyance of the articles from first area 17 to second area 18 so that the articles are removed from the first area in a predetermined article pattern (a pattern, for example, wherein the articles in adjacent rows of articles are offset from one another, as is illustrated in FIG. 9A at article pick up from the first area) and are deposited at the second area in a second, and different, predetermined article pattern (a nested pattern, for example, wherein the articles in adjacent rows are offset and in contact with one another (commonly referred to as a number one stagger), as is illustrated in FIG. 9B after article deposit at the second area).

Movement of pantograph 90 in opening and closing directions is effected by spacer actuating unit 97 that includes, as shown in FIG. 4, electric motor 98 is centrally mounted on a first pick-up unit 24 by mount 99 at one side of the plurality of pick-up units at conveyor 20, with motor 98 driving belt 100 about sprockets 101 having screws 102 mounted therein above sections 91 and 92 of the pantograph, with sprockets 101 being mounted on brackets 103, also connected to the first pick-up unit.

Each section 91 and 92 of pantograph 90 has each center pivot 93 connected with an associated pick-up unit of the plurality of pick-up units at conveyor 20 and the center pivot connected with the last pick-up unit (i.e., the pick-up unit most removed from the first pick-up unit and hence at the other side of the plurality of pick-up units on conveyor 20) has a connector 104 connected therewith that includes a nut receiving screw 102 therein whereby movement of the belt causes rotation of the screws to move the pantograph either outwardly or inwardly, depending upon the direction of screw rotation, to thereby uniformly vary the spacing between each of the pick-up units at the conveyor.

While a pantograph and related movement control of the pantograph is set forth herein to effect spacing adjustment between the pick-up units, controlled variations in spacing between the pick-up units could, at least for some applications, be effected by comparable other apparatus, including other mechanical apparatus capable of achieving specific spacing variations between the pick-up units.

As shown in FIGS. 1 through 3, spacer sheets 106 (normally cardboard or similar material sheets) are normally deposited during palletizing of articles and are removed during depalletizing of articles. As shown, spacer sheet area, or station, 107 is positioned adjacent to palletizing-depalletizing station 15 at the side of station 15 opposite to that of load-unload station 16, and includes a spacer sheet platform 108.

Spacer sheets 106 are transferred to and from palletizing-depalletizing station 15 by spacer sheet, or second, conveyor 110. Conveyor 110 includes a plurality of suction cups 111 to engage the spacer sheet then to be picked up and transferred. Application of negative pressure to the suction cups is provided by vacuum generator 112 connected to the air supply through solenoid 113.

Spacer sheet conveyor 110 is connected with spacer sheet, or second, carriage 115 to control vertical and horizontal movement of conveyor 110. As indicated, electric motor 116, mounted on carriage 115, is connected through gear box 117 to 90° gear box 118. Four rods 119 are connected at each end to a 90° gear box 118 so that electric motor 116 drives all four rods 119, horizontally positioned near the four outer edges of carriage 115, to rotate the rods. A wide belt 120 is mounted on each rod 119 with the free end of each wide belt 120 being connected to conveyor 110 near different ones of the four outer edges so that vertical movement (upward and downward) of conveyor 110 is effected by rotation of rods 119 in the same manner as described above with respect to vertically controlled movement of conveyor 20 by rotation of rods 62.

Spacer sheet carriage 115 has wheels 121 that ride on horizontal tracks 57 to enable horizontal movement of carriage 115 and conveyor 110 to move conveyor 110 between palletizing-depalletizing station 15 and spacer sheet area 107 (horizontal tracks 57 extend to a position over spacer sheet area 107 to allow transfer of spacer sheets 106, as needed, between spacer sheet area 107 and palletizing-depalletizing station 15).

Horizontal movement of spacer sheet carriage 115 is effected by electric motor 122 mounted on frame 58 with electric motor 122 driving chain 123 about sprockets 124 through gear box 125 with chain 123 being connected with spacer sheet carriage 115 by connector plate 126.

While not illustrated herein, some arcuate movement of conveyor 110 could be established, if needed, after movement of conveyor 110 away from the first and second areas, by applying power to electric motor 122 prior to terminating power to electric motor 116.

Articles 11 transferred to load-unload station 16, for conveyance therefrom to palletizing-depalletizing station 15, are normally transferred in mass with the articles normally arranged in parallel longitudinally extending rows with the articles in adjacent rows normally being either offset or parallel with respect to one another (with the arrangement in FIGS. 1 through 3 illustrating adjacent rows of articles offset from one another) when the articles reach load-unload area 16, and such transfer can be effected, as indicated in FIGS. 1 through 3, by additional conveyor unit 128 positioned adjacent to load-unload station 16 at the side thereof opposite to that of palletizing-depalletizing station 15.

Conveyor unit 128 preferably includes a continuously running conveying belt 129 with side rails 130 at the opposite sides thereof, and operates with belt 129, driven by electric motor 131 through chain 132 rotating about sprockets 133, moving in the direction of load-unload station 16 to convey articles to the load-unload station during palletizing operations, and operates with belt 129 moving in a direction away from load-unload station 16 to convey articles from the load-unload station during depalletizing operations.

Conveyor unit 128, as shown, also includes article flow control unit 135 having air cylinder 136 for extending and retracting plural plungers 137 (shown in FIG. 1 with adjacent plungers offset to accommodate receiving articles on belt 129 with adjacent article rows offset from one another), with air cylinder 136 having solenoid 138 connected therewith to enable flow control unit 135 to control flow of articles by groups into load-unload station 16. Plungers 137 are retracted to allow groups of articles (with each group including a predetermined number of articles in plural rows) to be received at load-unload station 16 during palletizing operations (normally an entire layer of articles is allowed to move to the load-unload station during palletizing operations during each group conveyance of articles to the load-unload station).

Article conveying control unit 139 includes electric motor 140 driving endless chains 141 (with one chain at each side of conveyor belt 129) about sprockets 142 having shaft 143 extending therebetween. Article engaging arm 144 extends across conveyor belt 129 to engage the articles on the conveyor belt (arm 144 is shown in FIG. 3 as an arm with indentions therein to accommodate leading rows of offset articles) so that arm 144 is caused to be moved along the path of the articles in the direction of load-unload station 16 to lead each group of articles being conveyed by conveyor belt 129 toward and into load-unload station 16 during palletizing operations, is caused to be stopped to provide a stop after leading the articles onto load-unload station 16 to prevent articles from movement beyond load/unload station 16 during palletizing operations, and is caused be moved along the path of the articles in a direction away from the load-unload station to lead (or, alternately, to trail) the articles being conveyed by conveyor belt 129 from load-unload station 16 during depalletizing operations.

Operational control is provided by operation control unit 146, such as a computer having a program, to effect actuation and control of device 10 as set forth herein, including control of the electric motors and solenoids, as above described, in timed relationship and, preferably, in conjunction with sensors (not shown), so that operation, as set forth herein, is established for either palletizing or depalletizing of articles.

During normal operation to palletize articles, and with article conveyor 20 at and above load-unload station 16 and spacer sheet conveyor 110 at and above palletizing-depalletizing station 15, conveyors 20 and 110 are independently moved vertically downward so that article engaging portions 27 of elongated arms 26 of each pick-up unit 24 on conveyor 20 are adjacent and at opposite sides of each longitudinally extending row of articles then at the load-unload station, after which the elongated arms are allowed to be biased closed so that the article engaging portions engage the neck portions of the articles, and so that a spacer sheet maintained on conveyor 110 is deposited on top of the last deposited layer of articles on pallet 148 (or is deposited on the pallet if no layer of articles has then been deposited on the pallet) at the palletizing-depalletizing station by release of negative pressure applied through suction cups Conveyor 20 (with the articles removed from the load-unload station maintained thereon) and conveyor 110 (with no spacer sheet maintained thereon) are then independently moved vertically upward (to the positions shown in FIGS. 1 and 2), and article conveying control unit 139 is moved to a position adjacent to article flow control unit 135 after further movement of conveyor 20 vertically upward (from the position of conveyor 20 as shown in FIGS. 1 and 2).

Prior to deposit of the spacer sheet at the palletizing-depalletizing station, orienting unit 71 is positioned at the palletizing-depalletizing station with upper fences 81 adjacent to the area of deposit of the spacer sheet by conveyor 110, and, after deposit of the spacer sheet and commencement of vertically upward movement of conveyor 110, fences 81 are moved inwardly to orient, normally center, the spacer sheet.

After vertically upward movement of conveyors 20 and 110, both are then moved horizontally with conveyor 20 being moved to a position over palletizing-depalletizing station 15 and conveyor 110 being moved to a position over spacer sheet area 107. During upward and/or horizontal movement of conveyor 20, pick-up unit spacing adjustor 89 is caused to be moved from its initial spaced setting of the pick-up units to adjust the spacing between the pick-up units if a spacing adjustment is to be effected after removal of the articles from the load-unload station and before the articles are deposited at the palletizing-depalletizing station in a different pattern.

Conveyors 20 and 110 are then independently moved vertically downward with conveyor 20 being moved downward to the palletizing-depalletizing station to deposit the removed articles thereat, and conveyor 110 being moved vertically downward to the spacer sheet area to pick up a spacer sheet thereat.

Prior to conveyor 20 reaching the palletizing-depalletizing station, orienting unit 71 is moved (normally raised) to a position with lower fences 80 adjacent to the area where deposit of the articles is then to occur, and additional conveyor unit 128 is caused to allow a new group of articles to be transferred to the load-unload station with arm 144 leading the articles to the load-unload station.

After conveyor 20 has reached the area of palletizing-depalletizing station where deposit of articles is to occur (normally with the bottoms of the removed group in contact with a spacer sheet covering the previous layer of articles (or the pallet for a first layer of articles), the article engaging portions 27 of elongated arms 26 of pick-up units 24 are urged to the open position to release the articles, after which conveyor 20 is moved vertically upward and lower fences 80 of orienting unit 71 are moved inwardly to orient, normally center, the deposited group of articles on the pallet.

After conveyor 110 has reached spacer sheet area 107, a spacer sheet thereat is picked up by conveyor 110 by applying negative pressure to suction cups 111, after which conveyor 110 is moved vertically upward to remove the spacer sheet from the spacer sheet area.

After vertically upward movement, conveyors 20 and 110 are moved horizontally to positions over the load-unload and palletizing-depalletizing stations, respectively. During vertical and/or horizontal movement of conveyor 20 to the position over the load-unload station, pick-up spacing adjustor 89 is returned to its initial spaced setting of the pick-up units if a spacing adjustment has been effected during movement of conveyor 20 to the palletizing-depalletizing station to deposit the articles thereat.

This completes a cycle of operation. In a working embodiment, it has been found that a complete cycle of operation can be accomplished in about 15 seconds (i.e., about four cycles per minute).

Normal operation to depalletize articles is essentially the same as above described for palletizing articles, except that conveyor 20 picks up each group of articles from palletizing-depalletizing station 15 and deposits and releases the removed articles at load-unload station 16, conveyor 110 picks up each spacer sheet from palletizing-depalletizing station 15 and deposits each removed spacer sheet at spacer sheet area 107, pick-up unit spacing adjustor 89 causes the spacing to be adjusted from the initial spaced setting of the pick-up units if a spacing variation is to be effected after removal of the articles from the palletizing-depalletizing station and prior to deposit of the articles in a different pattern at the load-unload station and causes the spaced setting of the pick-up units to be returned to the initial spaced setting after deposit of the articles at the load-unload station and movement of conveyor 20 away from the load/unload station if a spacing adjustment has been effected prior to deposit of the articles at the load-unload station in a pattern different from that of the article pattern at the palletizing-depalletizing station, additional conveyor unit 128 transfers the articles from load-unload station 16, arm 144 of article conveying control unit 139 leads (or, alternately, trails) the articles from load-unload station 16, and orienting unit 71, if utilized, stabilizes articles and spacer sheets during removal from the palletizing-depalletizing station.

As can be appreciated from the foregoing, this invention provides an improved device and method for palletizing or depalletizing articles.

What is claimed is:

1. A device for at least one of palletizing and depalletizing containers having a neck portion, said device comprising:

first and second areas different ones of which are at a palletizing-depalletizing station and a load-unload station with containers at said first area arranged in plural rows for conveyance to said second area; and a conveyor movable between said first and second areas and having a plurality of pick-up units each of which is associated with a different one of said plural rows of containers at said first area with each of said pick-up units having a mechanically movable engaging assembly which engages with the neck portions of plural containers in said associated row of containers at said first area to enable said conveyor to pick up and remove plural rows of containers with plural containers in each said row at said first area and transfer said removed containers to said second area for deposit thereat.

2. The device of claim 1 wherein said mechanically movable engaging assembly of each of said pick-up units of said conveyor includes at least one movable elongated arm that extends along said plural containers in said associated row of containers and engages said plural containers to enable removal and transfer of said engaged containers from said first area to said second area.

3. The device of claim 1 wherein said mechanically movable engagable assembly of each of said pick-up units of said conveyor includes first and second movable elongated arms that extend along opposite sides of said plural containers in said associated row of containers and engage said plural containers therebetween to enable removal and transfer of said engaged containers from said first area to said second area.

4. The device of claim 1 wherein each of said pick-up units of said conveyor includes an arm control assembly having a constant force applicator for biasing said mechanically movable engaging assembly towards engagement with said plural containers in said associated row of containers and an arm actuator unit for overcoming said bias imposed by said constant force applicator to enable said mechanically movable engagable assembly to be urged away from engagement with said plural containers in said associated row of containers.

5. The device of claim 4 wherein said constant force applicator is a spring, and wherein said arm actuator unit includes a lever actuated movable pin engagable with said spring.

6. The device of claim 1 wherein said device includes an additional conveyor unit having a movable belt for conveying containers to said load-unload station when said load-unload station is a load station at said first area and for conveying containers from said load-unload station when said load-unload station is an unload station at said second area, said additional conveyor unit also including a flow control unit for controlling movement of containers by predetermined groups to said load-unload station.

7. The device of claim 1 wherein said device includes an orienting unit for orienting containers deposited by said conveyor at said palletizing-depalletizing station when said second area is at said palletizing-depalletizing station.

8. The device of claim 1 wherein said device includes a movable carriage and a support structure for said movable carriage whereby said movable carriage is movable in at least opposite horizontal directions, and wherein said conveyor is connected with said movable carriage to enable movement of said conveyor upwardly in a vertical path to remove said containers from said first area, horizontally to a position over said second area, and downwardly in a vertical path to deposit said containers at said second area.

9. The device of claim 1 wherein said device is for palletizing containers, wherein said load-unload station is a load station at said first area, wherein said palletizing-depalletizing station is a palletizing station at said second area, and wherein said conveyor engages and removes said plural rows of containers with plural containers in each said row at said load station and transfers said engaged containers to said palletizing station.

10. The device of claim 1 wherein said device is for depalletizing containers, wherein said palletizing-depalletizing station is a depalletizing station at said first area, wherein said load-unload station is an unload station at said second area, and wherein said conveyor engages and removes said plural rows of containers with plural containers in each row at said depalletizing station and transfers said engaged containers to said unload station.

11. The device of claim 1 wherein said containers are bottles having a neck portion, and wherein said mechanically movable engaging assembly of each of said plurality of pick-up units of said conveyor engages said neck portions of said bottles to remove and transfer said bottles from said first area to said second area.

12. A device for at least one of palletizing and depalletizing articles, said device comprising:

first and second areas different ones of which are at a palletizing-depalletizing station and a load-unload station with articles at said first area arranged in plural rows for conveyance to said second area;

a conveyor movable between said first and second areas and having a plurality of pick-up units each of which is associated with a different one of said plural rows of articles at said first area with each of said pick-up units having a mechanically movable article engaging assembly engagable with plural articles in said associated row of articles at said first area to enable said conveyor to pick up and remove plural rows of articles with plural articles in each said row at said first area and transfer said removed articles to said second area for deposit thereat;

a carriage connected with said conveyor and causing said conveyor to be moved after said deposit of the articles at said palletizing-depalletizing station; and an orienting unit for orienting articles deposited by said conveyor at said palletizing-depalletizing station when said second area is at said palletizing-depalletizing station, and wherein said orienting unit includes a frame having article engaging fences mounted thereon to cause the articles to be oriented upon movement of said fences toward the articles after said carriage has caused said conveyor to be moved following deposit of the articles at said palletizing-depalletizing station.

13. The device of claim 12 wherein said orienting unit also includes an actuator to cause said fences to be substantially simultaneously moved toward the articles to orient the articles.

14. A device for at least one of palletizing and depalletizing articles, said device comprising:

first and second areas different ones of which are at a palletizing-depalletizing station and a load-unload station with articles at said first area arranged in plural rows for conveyance to said second area;

a conveyor movable between said first and second areas and having a plurality of pick-up units each of which is associated with a different one of said plural rows of articles at said first area with each of said pick-up units having a mechanically movable article engaging assembly engagable with plural articles in said associated row of articles at said first area to enable said conveyor to pick up and remove plural rows of articles with plural articles in each said row at said first area and transfer said removed articles to said second area for deposit thereat;

a movable carriage and a support structure for said movable carriage whereby said movable carriage is movable in at least opposite horizontal directions, and wherein said conveyor is connected with said movable carriage to enable movement of said conveyor upwardly in a vertical path to remove said articles from said first area, horizontally to a position over said second area, and downwardly in a vertical path to deposit said articles at said second area;

a spacer sheet area;

a second movable carriage mounted on said support structure whereby said second movable carriage is movable in at least opposite horizontal directions; and a second conveyor connected with said second movable carriage to enable transfer of spacer sheets between said spacer sheet area and said palletizing-depalletizing station.

15. The device of claim 14 wherein said second area is at said palletizing-depalletizing station, wherein said device also includes an orienting device for orienting the articles and said spacer sheets deposited at said palletizing-depalletizing station, wherein said movable carriage causes said conveyor to be moved vertically upward following deposit of the articles at said palletizing-depalletizing station, wherein said orienting unit includes a frame having lower fences mounted thereon to cause the articles to be centrally positioned after said movable carriage has caused said conveyor to be moved vertically upward following deposit of the articles at said palletizing-depalletizing station, wherein said second movable carriage causes said second conveyor to be moved vertically upward following deposit of each of said spacer sheets at said palletizing-depalletizing station, and wherein said frame of said orienting unit also includes upper fences mounted thereon to cause each of said spacer sheets to be centrally positioned after said second movable carriage has caused said second conveyor to be moved vertically upward following deposit of each of said spacer sheets at said palletizing-depalletizing station.

16. A device for at least one of palletizing and depalletizing articles, said device comprising:

first and second areas different ones of which are at a palletizing-depalletizing station and a load-unload station with articles at said first area arranged in plural rows for conveyance to said second area;

a conveyor movable between said first and second areas and having a plurality of pick-up units each of which is associated with a different one of said plural rows of articles at said first area with each of said pick-up units having a mechanically movable article engaging assembly engagable with plural articles in said associated row of articles at said first area to enable said conveyor to pick up and remove plural rows of articles with plural articles in each said row at said first area and transfer said removed articles to said second area for deposit thereat; and a pick-up unit space adjustor connected with said plurality of pick-up units of said conveyor to uniformly adjust the spacing between said plurality of pick-up units as needed.

17. The device of claim 16 wherein said pick-up unit space adjustor includes a spacer determining unit and a space actuating unit to adjust the spacing between said plurality of pick-up units during transfer of the articles between said first and second areas whereby an article pattern can be established at said second area different from that at said first area.

18. A device for at least one of palletizing and depalletizing bottles having a neck portion, said device comprising:

first and second areas different ones of which are at a palletizing-depalletizing station and a load-unload station with bottles at said first area arranged in longitudinally extending plural rows;

a conveyor movable between said first and second areas and having a plurality of pick-up units each of which is associated with a different one of said plural longitudinally extending rows of bottles at said first area with each of said pick-up units having first and second elongated engaging arms extending longitudinally along and at opposite sides of said neck portions of said bottles of said associated plural row of bottles;

a conveyor control assembly for controlling movement of said conveyor between said first and second areas; and an arm control assembly for when causes said first and second engaging arms of each of said pick-up units to be urged toward one another to engage said neck portions of said bottles of said associated plural row of bottles to enable said conveyor to pick up and remove bottles at said first area by groups with each said group having plural rows of bottles with plural bottles in each said row when said conveyor is at said first area, and said arm control assembly also causing said first and second engaging arms of each of said pick-up units to be urged away from one another to release said bottles when said conveyor is at said second area.

19. The device of claim 18 wherein said groups of bottles at said first area constitute a layer of bottles, and wherein said first and second engaging arms of each of said pick-up units extend along the entire row of said plural bottles of each said associated row of said bottles whereby said layer of bottles is transferred from said first area to said second area by movement of said conveyor from said first area to said second area.

20. A device for at least one of palletizing and depalletizing unstable articles, said device comprising:

first and second areas different ones of which are at a palletizing-depalletizing station and a load-unload station with articles at said first area arranged in plural rows for conveyance to said second area;

a conveyor having a plurality of pick-up units each of which is associated with a different one of said plural rows of articles at said first area with each of said pick-up units having at least one article engaging portion engagable with plural articles in said associated row of articles at said first area to enable said conveyor to engage and remove plural rows of articles with plural articles in each said row at said first area and transfer said articles to said second area; and a pick-up unit space adjustor having a space determining unit connected with said plurality of pick-up units of said conveyor for varying the spacing between said plurality of pick-up units as needed to enable engagement of said at least one article engaging portion of each said pick-up unit with said plural articles in each said associated row of articles at said first area.

21. The device of claim 20 wherein each of said plurality of pick-up units of said conveyor includes first and second article engaging arms as said at least one article engaging portion.

22. The device of claim 20 wherein said space determining unit is a pantograph.

23. The device of claim 20 wherein said space determining unit maintains substantially the same spacing between said plurality of pick-up units during transfer of the articles from said first area to said second area whereby the article patterns at said first and second areas are substantially the same.

24. The device of claim 20 wherein said plurality of pick-up units remove the articles from said first area in a predetermined first article pattern, and wherein said unit space adjustor also includes a spacer actuating unit connected with said space determining unit to adjust the spacing between said plurality of pick-up units during transfer of the articles between said first and second areas whereby a predetermined second article pattern is established at said second area different from that of said predetermined first article pattern at said first area.

25. A method for at least one of palletizing and depalletizing containers having a neck portion, said method comprising:

providing first and second areas different ones of which are at a palletizing-depalletizing station and a load-unload station;

arranging containers with a neck portion at said first area in plural rows;

providing a conveyor movable between said first and second areas and having a plurality of pick-up units each of which is associated with a different one of said plural rows of containers at said first area with each of said pick-up units having relatively movable elongated arms;

moving said conveyor to said first area and causing said elongated arms of each of said pick-up units to engage the neck portions of plural containers in said associated row of containers at said first area;

moving said conveyor from said first area to cause removal of plural rows of containers with plural containers in each row from said first area; and moving said conveyor to said second area and causing said elongated arms to be disengaged from the neck portions of said removed containers transferred by said conveyor from said first area to said second area to thereby deposit the transferred containers at said second area.

26. The method of claim 25 wherein said method also includes pivoting said relatively movable elongated arms of each of said pick-up units in a direction to cause said arms to engage said plural containers in each associated row of containers at said first area, and pivoting said relatively movable elongated arms in the opposite direction to cause said arms to disengage said plural containers in each associated row of containers at said second area.

27. The method of claim 25 wherein said method includes causing said elongated arms of each of said pick-up units of said conveyor to engage all containers in said associated row of containers whereby all containers at said first area are engaged by said elongated arms and transferred to said second area by movement of said conveyor from said first area to said second area.

28. The method of claim 25 wherein said method includes moving the conveyor from the palletizing-depalletizing station after deposit of the containers at the palletizing-depalletizing station when said second area is at said palletizing-depalletizing station, and thereafter orienting the containers deposited at said palletizing-depalletizing station.

29. The method of claim 25 wherein said method also includes providing a spacer sheet area, and providing a second conveyor for transferring spacer sheets between said spacer sheet area and said palletizing-depalletizing station following each said transfer of the containers between said first and second areas.

30. The method of claim 29 wherein said method also includes providing said second area at said palletizing-depalletizing station, moving said conveyor from said palletizing-depalletizing station following each said deposit of the containers thereat, orienting the containers after said conveyor has been moved from said palletizing-depalletizing station following said deposit of the containers thereat, moving said second conveyor from said palletizing-depalletizing station after each said deposit of a said spacer sheet thereat, and orienting said spacer sheet after said second conveyor has been moved from said palletizing-depalletizing station following deposit of said spacer sheet thereat.

31. The method of claim 25 wherein said method includes causing the containers to have a pattern at said second area that is substantially the same as the pattern removed from said first area.

32. A method for at least one of palletizing and depalletizing articles, said method comprising:

providing first and second areas different ones of which are at a palletizing-depalletizing station and a load-unload station;

arranging articles at said first area in plural rows;

providing a conveyor movable between said first and second areas and having a plurality of pick-up units each of which is associated with a different one of said plural rows of articles at said first area with each of said pick-up units having relatively movable elongated arms;

moving said conveyor to said first area and causing said elongated arms of each of said pick-up units to engage plural articles in said associated row of articles at said first area;

moving said conveyor from said first area to cause removal of the articles from the first area in a predetermined article pattern having plural rows of articles with plural articles in each row;

moving said conveyor to said second area and adjusting the spacing between the articles during said moving of the articles to said second area;

depositing the articles at said second area in a predetermined article pattern different from said predetermined article pattern of the articles removed from said first area; and causing said elongated arms to be disengaged from said removed articles transferred by said conveyor from said first area to said second area.

33. A device for at least one of palletizing and depalletizing containers having a neck portion, said device comprising:

first and second areas different ones of which are at a palletizing-depalletizing station and a load-unload station with containers at said first area arranged in plural rows for conveyance to said second area; and a conveyor movable between said first and second areas and having a mechanically movable engaging assembly engagable with the neck portions of plural containers in said plural rows of containers at said first area to enable said conveyor to pick up and remove plural rows of containers with plural containers in each said row at said first area and transfer said removed containers to said second area for deposit thereat.

34. The device of claim 33 wherein said mechanically movable engaging assembly of said conveyor includes a plurality of associated engaging elements engagable with plural containers in said plural rows of containers at said first area to enable said conveyor to pick up and remove plural rows of containers with plural containers in each said row at said first area and transfer said removed containers to said second area for deposit thereat.

* * * * *